(12) United States Patent
Sheu

(10) Patent No.: US 11,709,460 B2
(45) Date of Patent: Jul. 25, 2023

(54) DIGITAL DISPLAY AND DIGITAL TIME DEVICE

(71) Applicant: Kevin Sheu, Taipei (TW)

(72) Inventor: Kevin Sheu, Taipei (TW)

(*) Notice: Subject to any disclaimer, the term of this patent is extended or adjusted under 35 U.S.C. 154(b) by 394 days.

(21) Appl. No.: 17/262,619

(22) PCT Filed: Dec. 6, 2019

(86) PCT No.: PCT/CN2019/123492
§ 371 (c)(1),
(2) Date: Jan. 22, 2021

(87) PCT Pub. No.: WO2020/155850
PCT Pub. Date: Aug. 6, 2020

(65) Prior Publication Data
US 2021/0325830 A1    Oct. 21, 2021

(30) Foreign Application Priority Data

Jan. 30, 2019 (CN) .......................... 201910092745.8

(51) Int. Cl.
*G04B 19/20* (2006.01)
*F16H 37/12* (2006.01)
*G04B 13/00* (2006.01)

(52) U.S. Cl.
CPC ........... *G04B 19/205* (2013.01); *F16H 37/12* (2013.01); *G04B 13/00* (2013.01)

(58) Field of Classification Search
CPC ............ G04C 17/0025; G04C 17/0033; G04B 19/24306; G04B 19/24386; G04B 19/00; G04B 19/205; G04B 19/207
See application file for complete search history.

(56) References Cited

U.S. PATENT DOCUMENTS 3,721,087 A * 3/1973 Boyles ................... G04B 19/00
368/220

\* cited by examiner

*Primary Examiner* — Renee S Luebke
*Assistant Examiner* — Matthew Hwang
(74) *Attorney, Agent, or Firm* — Chun-Ming Shih; HDLS IPR Services

(57) ABSTRACT

A digital display and a digital time device are provided, which includes a housing, a drive assembly, display assemblies and a mainboard assembly. The housing is provided with seven windows arranged to form the shape of the character " 日 ". The mainboard assembly is fixedly connected to the housing and is located behind the windows. Seven curved grooves are provided inside of the drive assembly. The display assemblies include display sheets and pull rods. One end of each pull rod is fixedly connected to the display sheets. The display sheets are slidingly connected to the mainboard assembly. There are seven display assemblies. Each pull rod is slidingly connected to the curved grooves in one-to-one correspondence, and each display sheet is one-to-one correspondence with the windows. The present invention can achieve many advantages, such as low power consumption, great waterproof, strong moisture resistance capabilities and high stability.

10 Claims, 12 Drawing Sheets

DIGITAL DISPLAY AND DIGITAL TIME DEVICE

BACKGROUND OF THE INVENTION

1. Field of the Invention

The present invention relates to counting and timing technologies, in particular to a digital display and a digital time device.

2. Description of the Prior Art

Currently, most frequently used digital displays or digital clocks usually consists of an electronic screen and internal circuits needing continuous power supply, so will result in high power consumption. Besides, the waterproof and moisture resistance capabilities of these devices are poor, so these devices tend to malfunction on rainy days or in humid environments.

SUMMARY OF THE INVENTION

The present invention provides a digital display and a digital time device in order to solve the problems of prior art. The present invention can achieve low power consumption and great waterproof capability by providing the windows arranged to form the shape of the Chinese character "日" to display digits and time, and using dry cells to serve as the power source to intermittently drive the display and the device.

To achieve the foregoing objective, the present invention provides a digital display, which includes a housing, a drive assembly, a plurality of display assemblies and a mainboard assembly. The housing is provided with seven windows arranged to form the shape of the Chinese character "日". The mainboard assembly is fixedly connected to the housing and located behind the windows. The drive assembly is provided with seven curved grooves. The display assemblies include display sheets and pull rods; one end of each pull rod being fixedly connected to the display sheets, and the display sheets are slidingly connected to the mainboard assembly. The number of the display assemblies is seven. Each of the pull rods is slidingly connected to the curved grooves in one-to-one correspondence and each of the display sheets is in one-to-one correspondence with the windows.

In one embodiment, the drive assembly includes a first rotation plate, a second rotation plate, a third rotation plate, a fourth rotation plate, a first rotation shaft and a second rotation shaft. One side of the first rotation plate is provided with a first curved groove and the other side of the first rotation plate is provided with a second curved groove. One side of the second rotation plate is provided with a third curved groove and the other side of the second rotation plate is provided with a fourth curved groove. One side of the third rotation plate is provided with a fifth curved groove and the other side of the third rotation plate is provided with a sixth curved groove. One side of the fourth rotation plate is provided with a seventh curved groove. The mainboard assembly includes an upper mainboard and a lower mainboard. The first rotation shaft is fixedly connected to the circle centers of the first rotation plate and the second rotation plate, and is rotatably connected to the upper mainboard. The second rotation shaft is fixedly connected to circle centers of the third rotation plate and the fourth rotation plate, and is rotatably connected to the lower mainboard. The first rotation shaft is transmissionally connected to the second rotation shaft.

In one embodiment, the other end of each pull rod is provided with a long circular hole, and the long circular hole is sleeved on the first rotation shaft or the second rotation shaft.

In one embodiment, each of the pull rods is provided with a sliding block and each of the sliding blocks is slidingly connected to the curved grooves in one-to-one correspondence.

In one embodiment, the drive assembly includes a first gear and a second gear. The circle center of the first gear is fixedly connected to the first rotation shaft. The circle center of the second gear is fixedly connected to the second rotation shaft. The first gear engages with the second gear.

In one embodiment, each of the display assemblies further includes a first lever plate and a second lever plate. One end of the first lever plate is hinged on one end of one of the display sheets and the other end of the first lever plate is hinged on one end of one of the pull rods. The first lever plate is further rotatably connected to the mainboard assembly. One end of the second lever plate is hinged on one end of one of the display sheets and the other end of the second lever plate is hinged on one end of one of the pull rods. The second lever plate is further rotatably connected to the mainboard assembly.

In one embodiment, the digital display further includes a drive wheel and a driven wheel. The drive wheel is rotatably connected to the housing. The circle center of the driven wheel is fixedly connected to the second rotation shaft. The drive wheel is connected to the driven wheel.

To achieve the foregoing objective, the present invention further provides a digital time device, which includes a rack, an ones-place of minute display, a tens-place of minute display, an ones-place of hour display and a tens-place of hour display fixed on the rack. Each of the ones-place of minute display, the tens-place of minute display, the ones-place of hour display and the tens-place of hour display is the display set forth above. The tens-place of hour display is provided with four curved grooves and four display assemblies, and four of the display sheets are in one-to-one correspondence with four of the windows.

The digital time device further includes a first thumb wheel, a second thumb wheel, a first ratchet gear, a second ratchet gear and transmission mechanisms. The first thumb wheel is connected to a drive assembly of the ones-place of minute display. The first ratchet gear is connected to the drive assembly of the tens-place of minute display. The second thumb wheel is connected to the drive assembly of the ones-place of hour display. The second ratchet gear is connected to the drive assembly of the tens-place of hour display. There are two transmission mechanisms. The first thumb wheel is connected to the first ratchet gear via one of the transmission mechanisms, and the second thumb wheel is connected to the second ratchet gear via the other one of the transmission mechanisms.

In one embodiment, each of the transmission mechanisms includes a link rod, an adjustable extension tip and a tension spring. The adjustable extension tip is fixed on the link rod, and presses against the first ratchet gear or the second ratchet gear. The link rod is provided with a stopper, and the first thumb wheel or the second thumb wheel presses against the stopper. The link rod is slidingly connected to the lower mainboard. One end of the tension spring is fixedly connected to the link rod and the other end of the tension spring is fixedly connected to the lower mainboard.

In one embodiment, the digital time device further includes a touch rotation plate, a microswitch and a second motor. The edge of the touch rotation plate is provided with two protrusion blocks symmetrical to each other. The touch rotation plate is connected to the drive assembly of the tens-place of minute display, the microswitch is fixed on the rack and triggered by one of the protrusion blocks. The microswitch is electrically connected to the second motor and the second motor is connected to the drive assembly of the ones-place of hour display The present invention has the following advantages: mechanically displaying the digits and time by the display sheets; achieving low power consumption by using dry cells to serve as the power source; great waterproof and moisture resistance capabilities; achieving high stability by using several specific curved grooves to drive the display sheets to orderly display digits.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION OF THE PREFERRED EMBODIMENT

Figure 1:
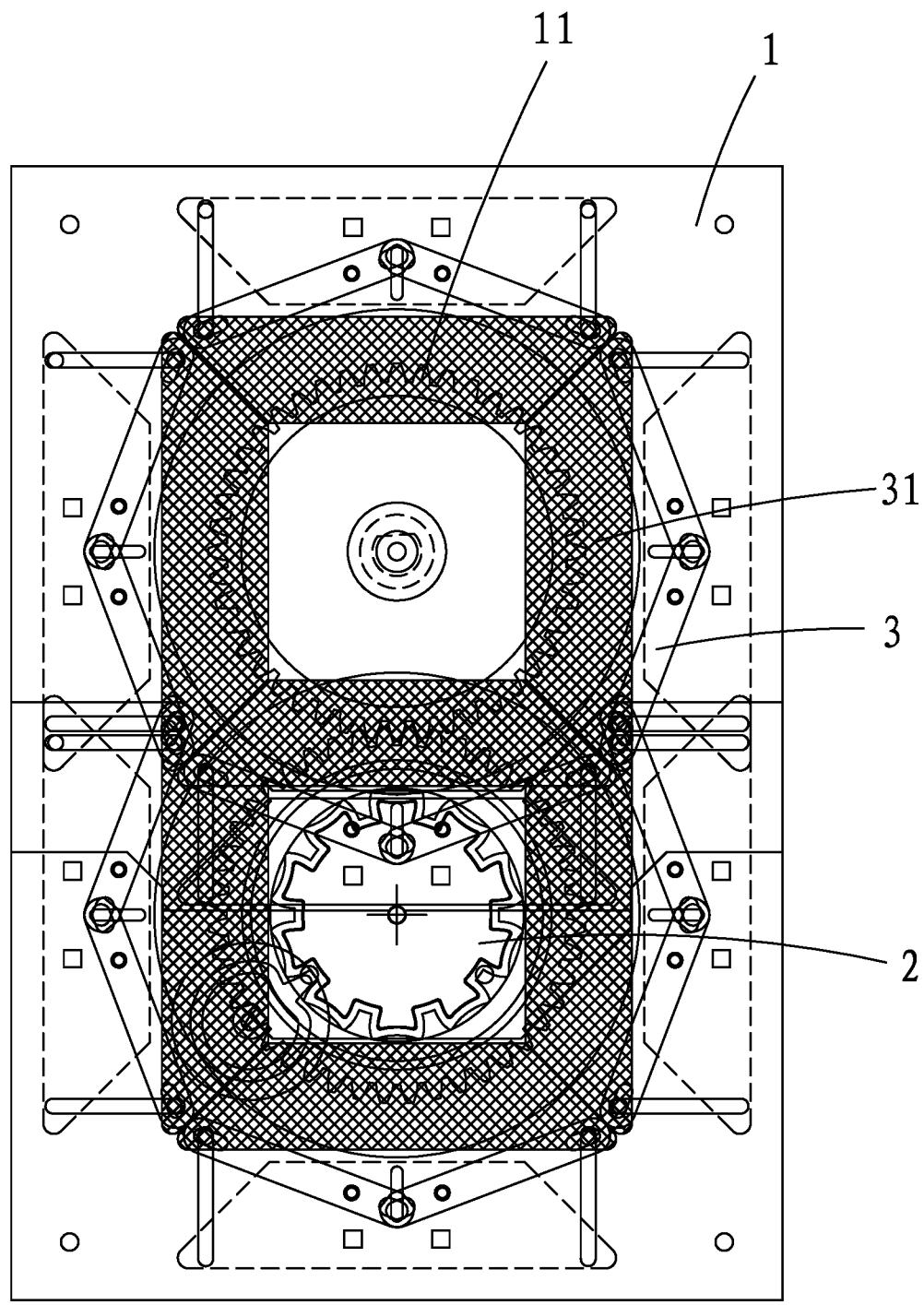
FIG. 1 is a schematic view of a working structure of display sheets of a digital display in accordance with a first embodiment of the present invention.
Figure 2:
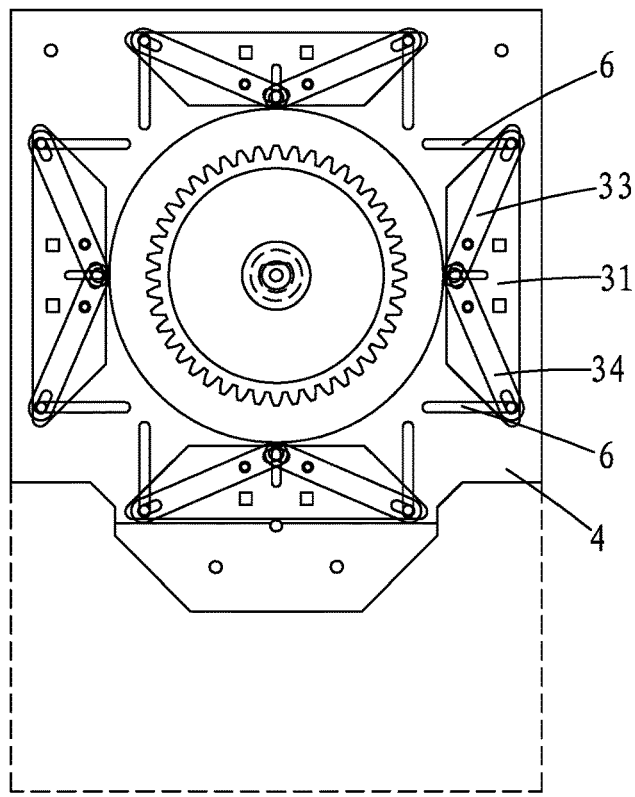
FIG. 2 is a structural schematic view of the display sheets and an upper mainboard of the digital display in accordance with the first embodiment of the present invention.
Figure 3:
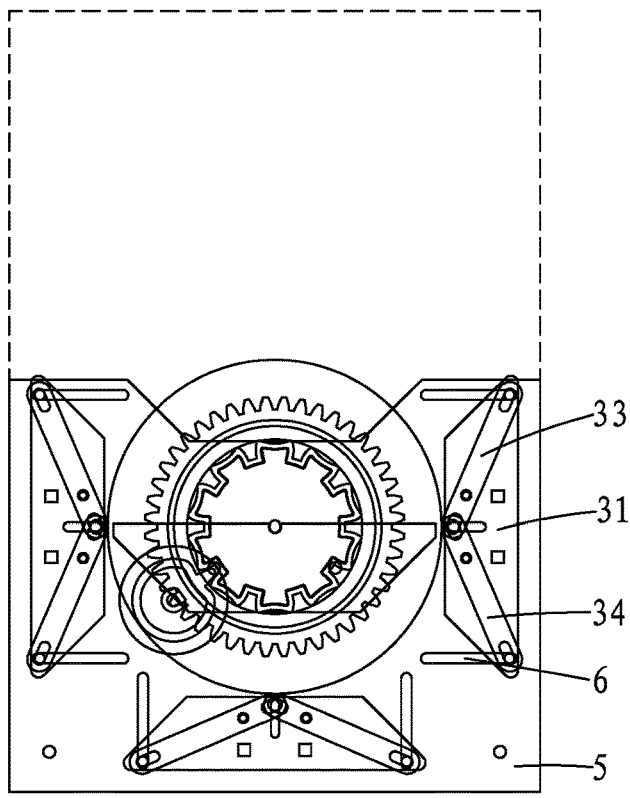
FIG. 3 is a structural schematic view of the display sheets and a lower mainboard of the digital display in accordance with the first embodiment of the present invention.
Figure 4:
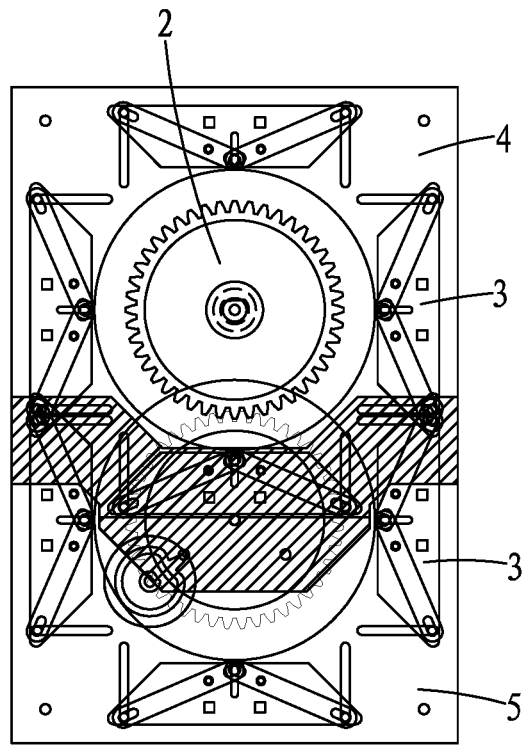
FIG. 4 is a schematic view of combining the upper mainboard with the lower mainboard of the digital display in accordance with the first embodiment of the present invention.
Figure 5:
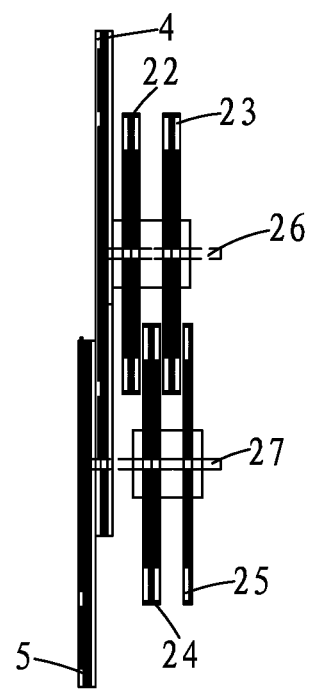
FIG. 5 is a first right side view of the digital display of FIG. 4 in accordance with the first embodiment of the present invention.
Figure 6:
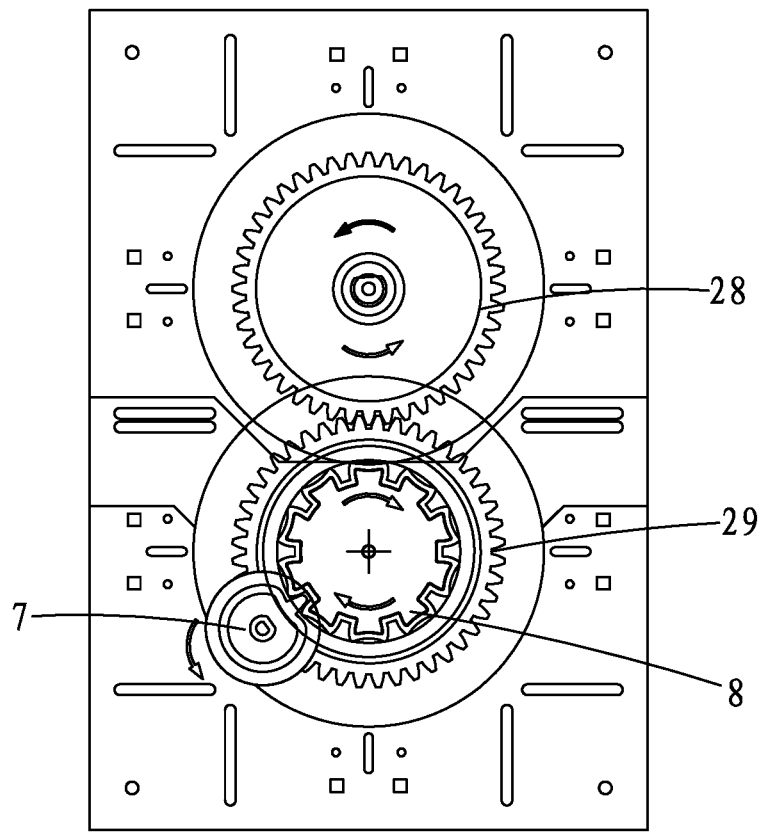
FIG. 6 is a structural schematic view of a drive wheel driving a driven wheel of the digital display in accordance with the first embodiment of the present invention.
Figure 7A:
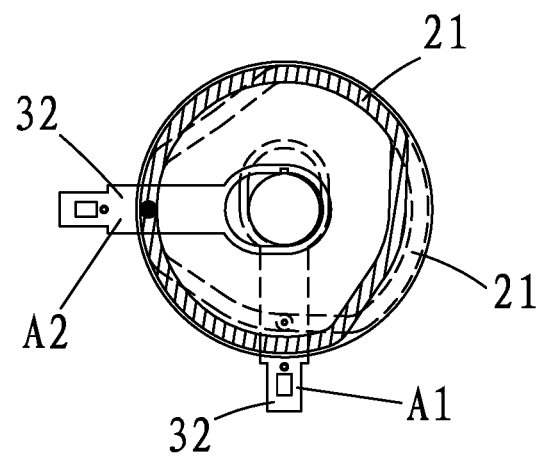
FIG. 7a is a structural schematic view of a first rotation plate and a pull rod of the digital display in accordance with the first embodiment of the present invention.
Figure 7B:
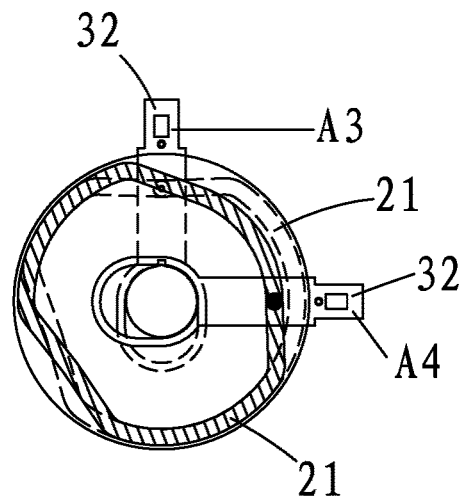
FIG. 7b is a structural schematic view of a second rotation plate and a pull rod of the digital display in accordance with the first embodiment of the present invention.
Figure 7C:
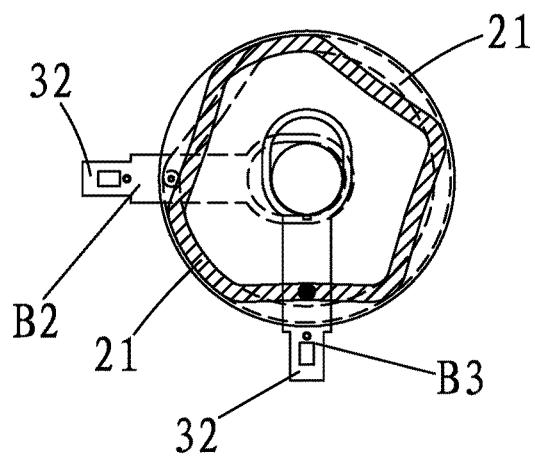
FIG. 7c is a structural schematic view of a third rotation plate and a pull rod of the digital display in accordance with the first embodiment of the present invention.
Figure 7D:
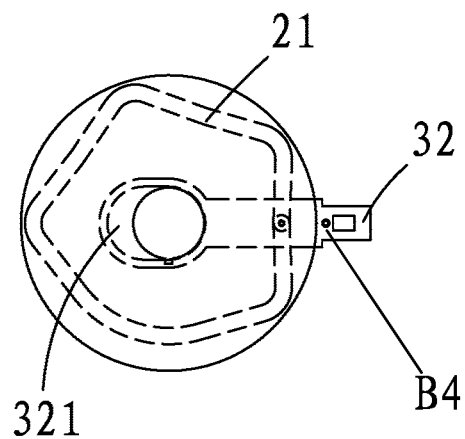
FIG. 7d is a structural schematic view of a fourth rotation plate and a pull rod of the digital display in accordance with the first embodiment of the present invention.

In the following description, it should be understood that the terms "center", "horizontal", "upper", "lower", "left", "right", "top", "bottom", "inner", "outer" for describing orientations or position relations are based on the orientations or position relations shown in the drawings, which is only for conveniently describing the present invention and simplifying the description instead of indicating or implying that the device or element referred to must have a specific orientation, be structured and operated in a specific direction. Therefore, these terms should not be understood as the limitations for the present invention.

Please refer to FIG. 1~FIG. 8, which show the first embodiment of the present invention.

A digital display is provided, which includes a housing 1, a drive assembly 2, a plurality of display assemblies 3 and a mainboard assembly. The housing 1 is provided with seven windows 11 arranged in the shape of the Chinese character "口". The mainboard assembly is fixedly connected to the housing 1 and located behind the windows 11. The drive assembly 2 is provided with seven curved grooves 21. The display assemblies 3 include display sheets 31 and pull rods 151. One end of each of the pull rods 151 is fixedly connected to the display sheets 31 and the display sheets 31 are slidingly connected to the mainboard assembly. The number of the display assemblies 3 is seven and each of the pull rods 32 is slidingly connected to the curved grooves 21 in one-to-one correspondence. Each of the display sheets 31 is in one-to-one correspondence with the windows 11.

After the drive assembly 2 is powered, the drive assembly 2 drives each of the pull rods 21 to slide along the curved grooves 21 in order to push out or pull back the pull rods 21, such that the display sheets 31 can move forward or backward to cover or expose the windows 11 arranged in the shape of the Chinese character "日 (RIH)" (close to the shape of the Arabic digit "8"). In this way, the windows 11 arranged in the shape of the Chinese character "口" can orderly display the digits "1", "2", "3", "4", "5", "6", "7", "8", "9" and "0". Thus, the digits can be mechanically displayed just by powering the drive assembly 2. The power source may be the dry cells of "D" size disposed inside the digital display. The power consumption of the digital display is low and the digital display can normally operate in rainy days or in humid environments.

Please refer to FIG. 7a~FIG. 7d. The drive assembly 2 includes a first rotation plate 22, a second rotation plate 23, a third rotation plate 24, a fourth rotation plate 25, a first rotation shaft 26 and a second rotation shaft 27. One side of the first rotation plate 22 is provided with the first curved groove 21 and the other side of the first rotation plate 22 is provided with the second curved groove 21. One side of the second rotation plate 23 is provided with the third curved groove 21 and the other side of the second rotation plate 23 is provided with the fourth curved groove 21. One side of the third rotation plate 24 is provided with the fifth curved groove 21 and the other side of the third rotation plate 24 is provided with the sixth curved groove 21. One side of the fourth rotation plate 25 is provided with the seventh curved groove 21. The mainboard assembly includes an upper mainboard 4 and a lower mainboard 5. The first rotation shaft 26 is fixedly connected to the circle centers of the first rotation plate 22 and the second rotation plate 23, and is rotatably connected to the upper mainboard 4. The second rotation shaft 27 is fixedly connected to circle centers of the third rotation plate 24 and the fourth rotation plate 25, and is rotatably connected to the lower mainboard 5. The first rotation shaft 26 is transmissionally connected to the second rotation shaft 27. In each of FIG. 7a~FIG. 7d, one of the curved grooves is shown by shadow lines and the other one of the curved grooves is shown by dotted lines.

In this way, the upper shaft and the lower shaft can spin at the same time, such that the four rotation plates can simultaneously rotate. The above 7 curved grooves 21 drive the corresponding pull rods 21 to push out or pull back the pull rods 21 respectively so as to orderly display the ten digits.

Figure 8:
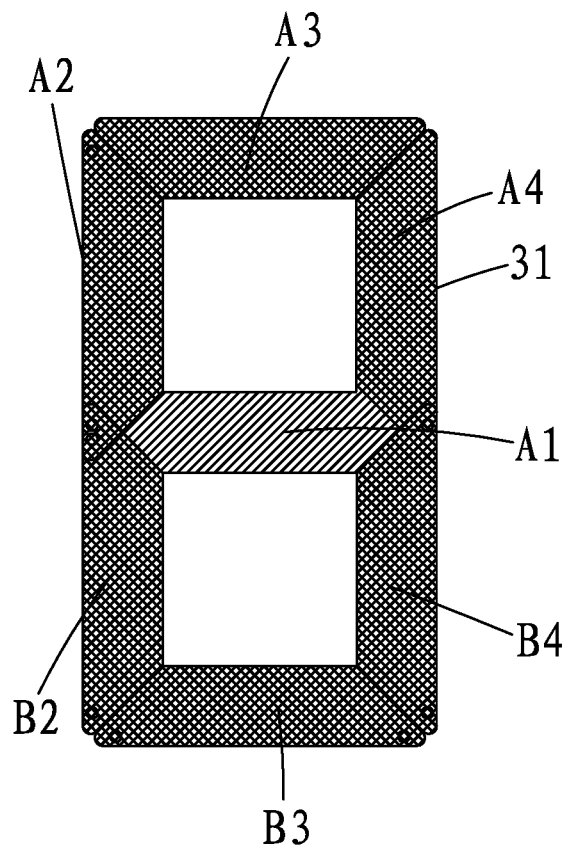
FIG. 8 is a structural schematic view of the display sheets arranged to form the shape of the character "日" and the corresponding pull rods in accordance with the first embodiment of the present invention.
Figure 9A:
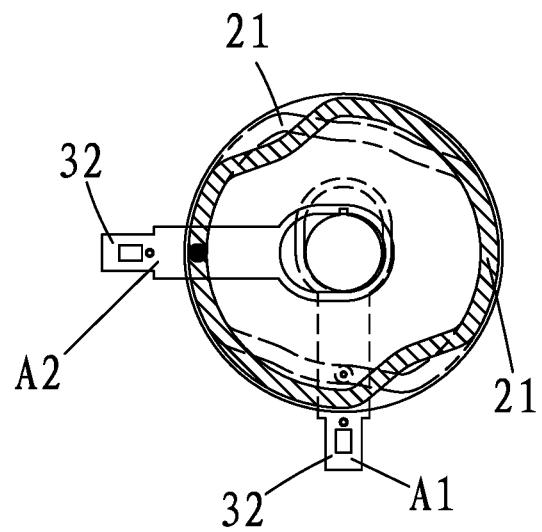
FIG. 9a is a structural schematic view of a first rotation plate and a pull rod of a tens-place of minute display in accordance with a second embodiment of the present invention.
Figure 9B:
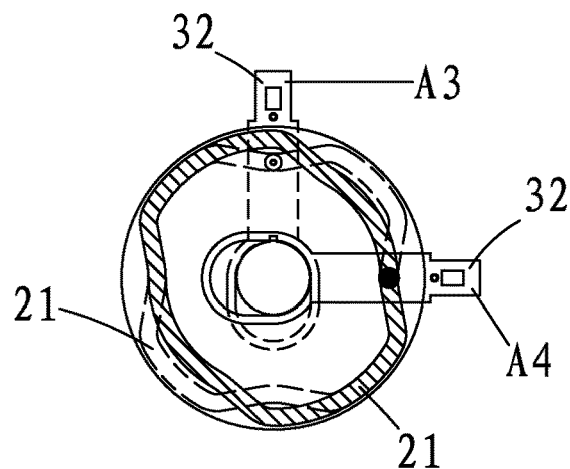
FIG. 9b is a structural schematic view of a second rotation plate and a pull rod of the tens-place of minute display in accordance with the second embodiment of the present invention.
Figure 9C:
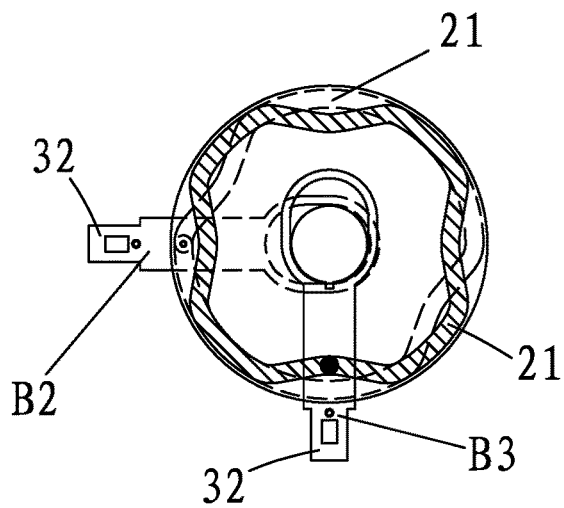
FIG. 9c is a structural schematic view of a third rotation plate and a pull rod of the tens-place of minute display in accordance with the second embodiment of the present invention.
Figure 9D:
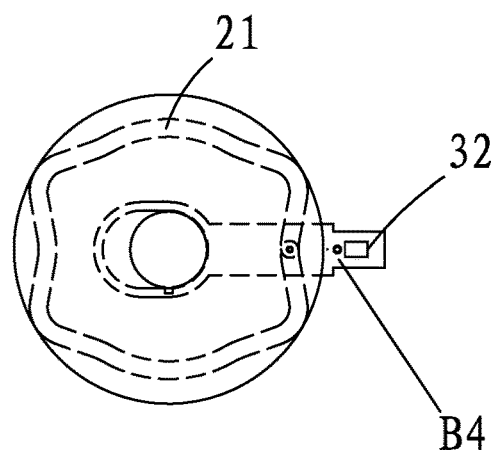
FIG. 9d is a structural schematic view of a fourth rotation plate and a pull rod of the tens-place of minute display in accordance with the second embodiment of the present invention.
Figure 10A:
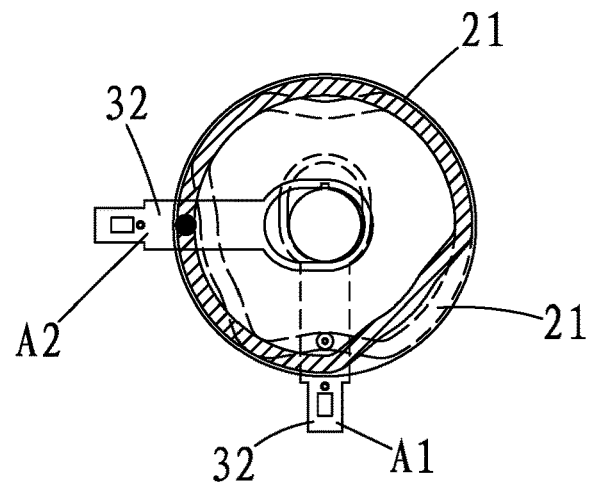
FIG. 10a is a structural schematic view of a first rotation plate and a pull rod of a ones-place of hour display in accordance with the second embodiment of the present invention.
Figure 10B:
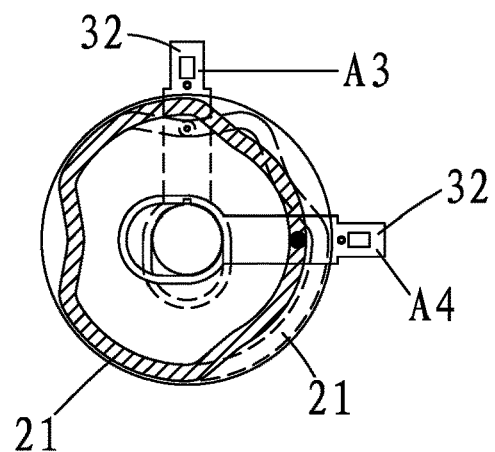
FIG. 10b is a structural schematic view of a second rotation plate and a pull rod of the ones-place of hour display in accordance with the second embodiment of the present invention.
Figure 10C:
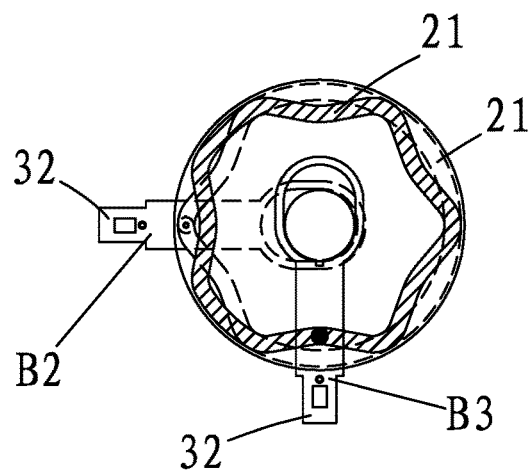
FIG. 10c is a structural schematic view of a third rotation plate and a pull rod of the ones-place of hour display in accordance with the second embodiment of the present invention.
Figure 10D:
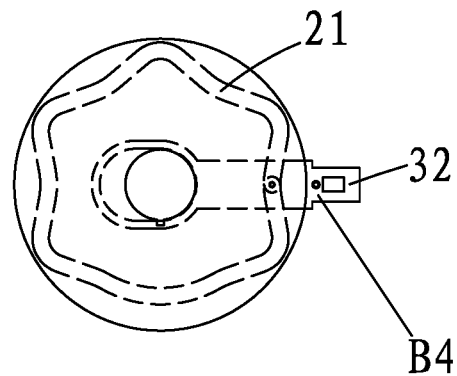
FIG. 10d is a structural schematic view of a fourth rotation plate and a pull rod of the ones-place of hour display in accordance with the second embodiment of the present invention.
Figure 11A:
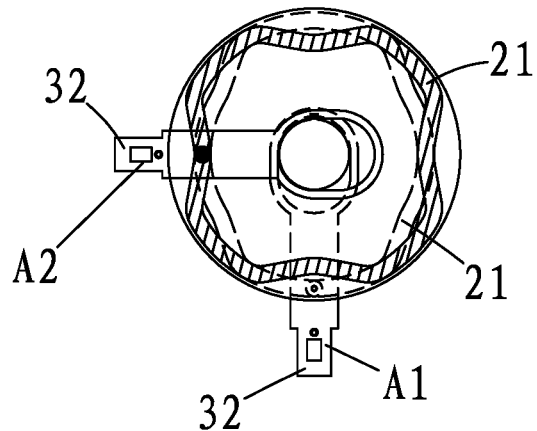
FIG. 11a is a structural schematic view of a first rotation plate and a pull rod of a tens-place of hour display in accordance with the second embodiment of the present invention.
Figure 11B:
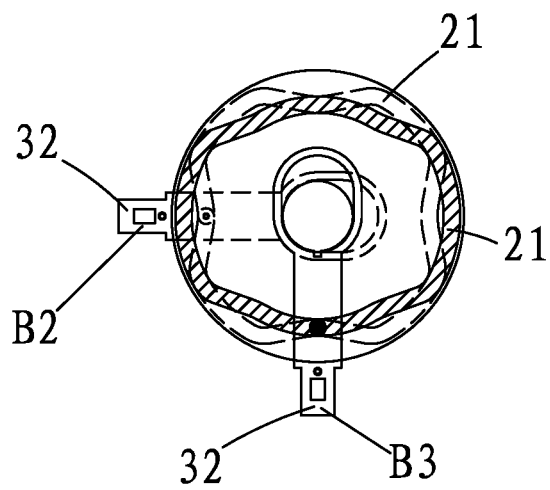
FIG. 11b is a structural schematic view of a second rotation plate and a pull rod of the tens-place of hour display in accordance with the second embodiment of the present invention.
Figure 12:
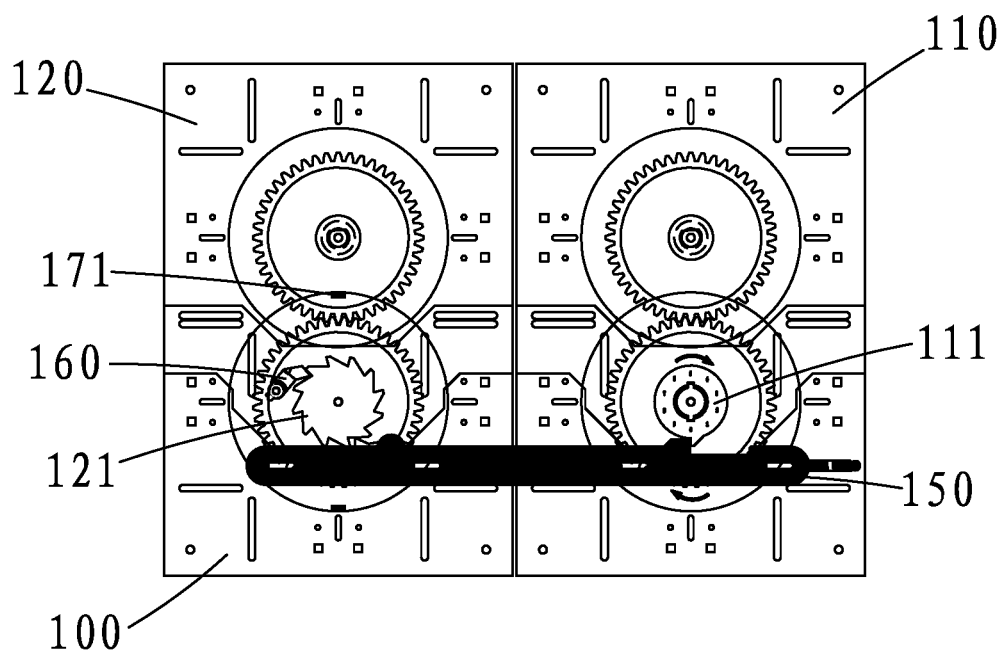
FIG. 12 is a schematic view of the ones-place of minute display driving the tens-place of minute display in accordance with the second embodiment of the present invention.
Figure 13:
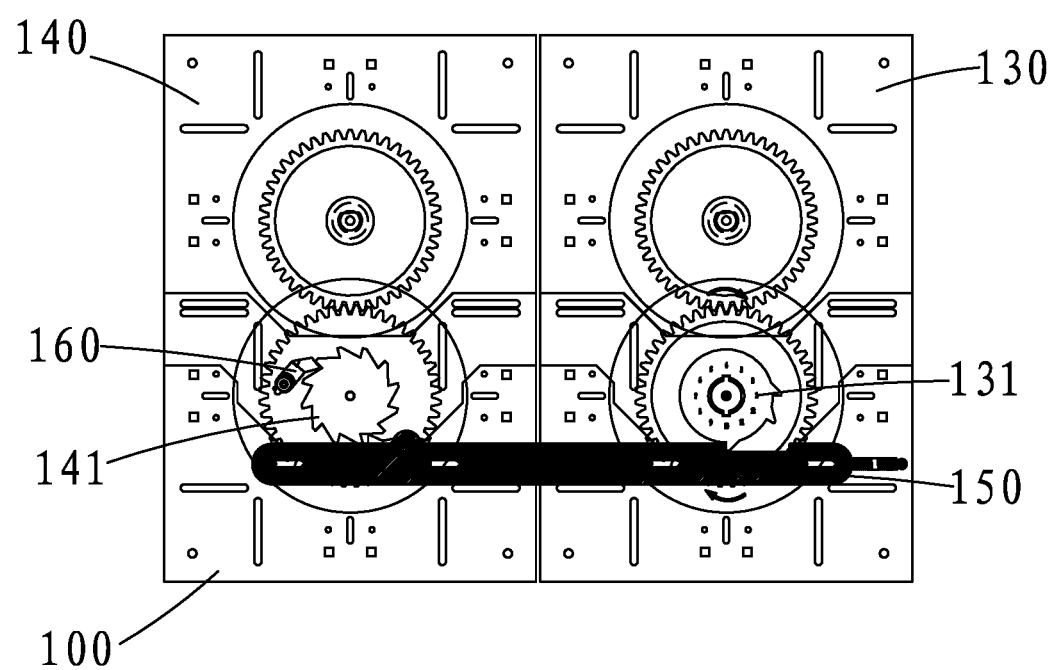
FIG. 13 is a schematic view of the ones-place of hour display driving the tens-place of hour display in accordance with the second embodiment of the present invention.
Figure 14:
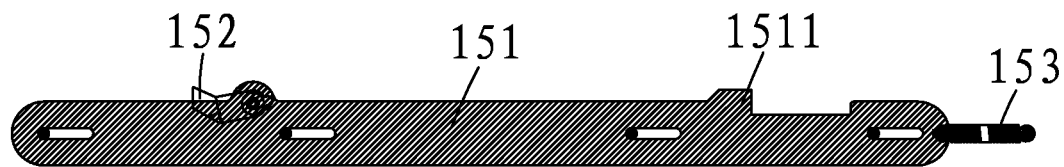
FIG. 14 is a structural schematic view of a transmission structure in accordance with the second embodiment of the present invention.
Figure 15:
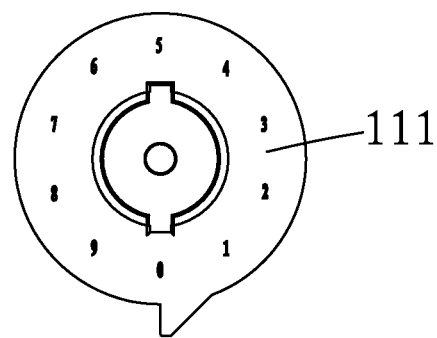
FIG. 15 is a structural schematic view of a first thumb wheel in accordance with the second embodiment of the present invention.
Figure 16:
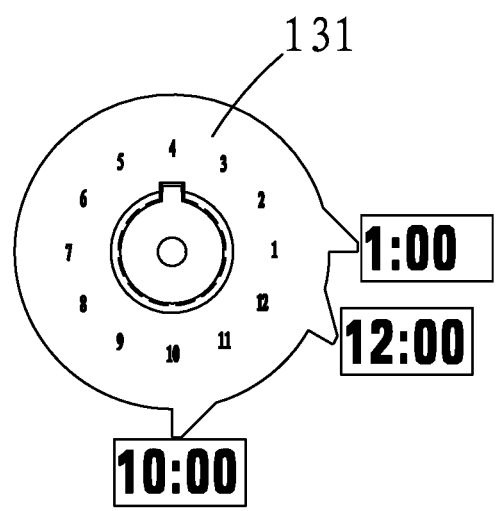
FIG. 16 is a structural schematic view of a second thumb wheel in accordance with the second embodiment of the present invention.
Figure 17:
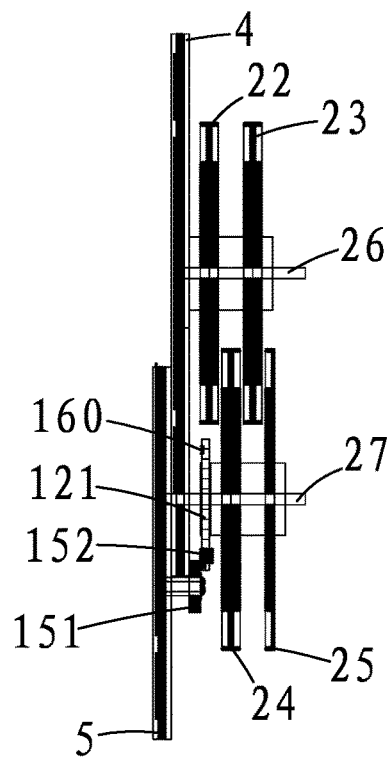
FIG. 17 is a second right side view of the digital display of FIG. 4 in accordance with the second embodiment of the present invention.
Figure 18:
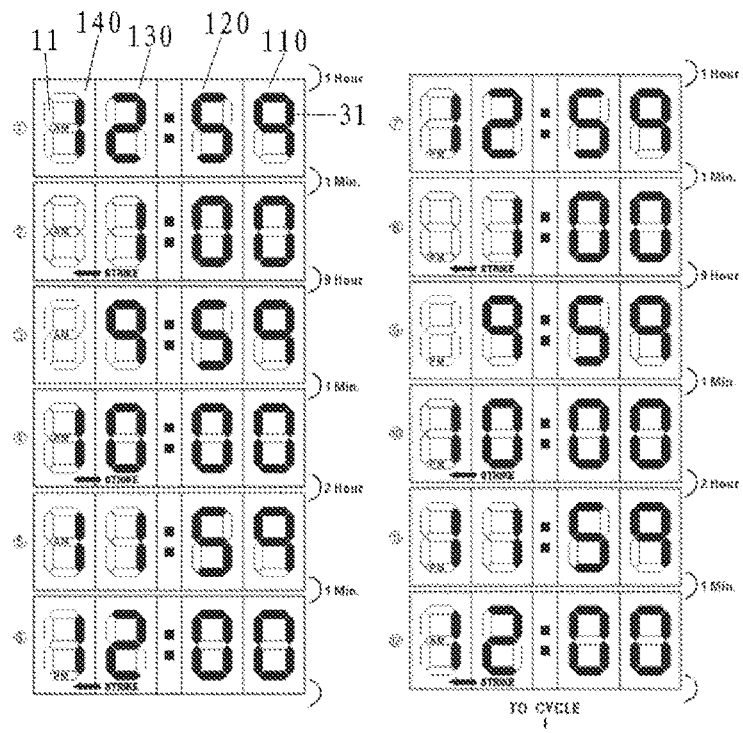
FIG. 18 is a schematic view of time displaying changes of a digital time device in accordance with the second embodiment of the present invention.

Please refer to FIG. 8, which shows the position relations between the display sheets arranged to form the shape of the Chinese character "日". The labels "A1", "A2", "A3", "A4", "B2", "B3", "B4" of the display sheets are corresponding to the labels "A1", "A2", "A3", "A4", "B2", "B3", "B4" of the pull rods shown in FIG. 7a~FIG. 7d, which means the pull rods are connected to the corresponding display sheets.

The other end of each of the pull rods 32 is provided with a long circular hole 321 and the long circular hole 321 is sleeved on the first rotation shaft 26 or the second rotation shaft 27, such that the moving direction of each of the pull rods 32 can be more stable so as to more completely display the digits.

Each of the pull rods 32 is provided with a sliding block 322 fixed thereon and each of the sliding blocks 322 is slidingly connected to the curved grooves 21 in one-to-one correspondence. In this way, the pull rods 32 can be more properly slidingly connected to the curved grooves 21.

The drive assembly 2 further includes a first gear 28 and a second gear 29. The circle center of the first gear 28 is fixedly connected to the first rotation shaft 26. The circle center of the second gear 29 is fixedly connected to the second rotation shaft 27. The first gear 28 engages with the second gear 29. The number of the teeth of the first gear 28 is the same with that of the second gear 29.

Each display assembly 3 further includes a first lever plate 33 and a second lever plate 34. One end of the first lever plate 33 is hinged on one end of one of the display sheets 31 and the other end of the first lever plate 33 is hinged on one end of one of the pull rods 32. The first lever plate 33 is further rotatably connected to the mainboard assembly. One end of the second lever plate 33 is hinged on one end of one of the display sheets 31 and the other end of the second lever plate 34 is hinged on one end of one of the pull rods 32. The second lever plate 34 is further rotatably connected to the mainboard assembly. According to principle of level, little displacements of the pull rods 32 can result in large displacements of the display sheets 31.

The upper mainboard 4 and the lower mainboard 5 are provided with a plurality of pilot holes 6. The end which the first level plate 33 is hinged on the display sheet 31 slides along the pilot hole 6 and the end which the second level plate 34 is hinged on the display sheet 31 also slides along another pilot hole 6, which can make the sliding movement of the display sheet 31 stabler. The display sheet 31 are disposed on the side, near the windows 11, of the upper mainboard 4 or the lower mainboard 5. The first lever plate 33 and the second lever plate 34 are disposed on the other side of the upper mainboard 4 or the lower mainboard 5.

The digital display further includes a drive wheel 7 and a driven wheel 8. The drive wheel 7 is rotatably connected to the housing 1. The circle center of the driven wheel 8 is fixedly connected to the second rotation shaft 27. The drive wheel 7 is connected to the driven wheel 8. When the drive wheel 7 makes a full rotation, the driven wheel 8 rotates a specific angle. More specifically, when the driven wheel 8 rotates 36 degrees, the second rotation shaft 27 and the first rotation shaft 26 rotate 36 degrees; meanwhile, the above four rotation plates also rotate. One digit is displayed after one rotation of 36 degrees. After the driven wheel 8 rotates 360 degrees, the digits can be orderly displayed again.

The digital display further includes a stepper motor (not shown in the drawings), the output shaft of the stepper motor (not shown in the drawings) is connected to the drive wheel 7. In this way, when the stepper motor (not shown in the drawings) is powered, the stepper motor (not shown in the drawings) can intermittently drive the drive wheel 7 to rotate. The stepper motor (not shown in the drawings) drives the drive wheel 6 to make a full rotation, the driven wheel 8 can be driven to rotate 36 degrees.

In another embodiment of the present invention, the four rotation plates of the drive assembly 2 can be also replaced by seven rotation plates and one side of each rotation plate can be provided with one curved groove 21.

Please refer to FIG. 8a~FIG. 18, which show the second embodiment of the present invention.

A digital time device is provided, which includes a rack 100, an ones-place of minute display 110, a tens-place of minute display 120, an ones-place of hour display 130 and a tens-place of hour display 140 fixed on the rack 110. Each of the ones-place of minute display 110, the tens-place of minute display 120, the ones-place of hour display 130 and the tens-place of hour display 140 is the display described in the first embodiment. In addition, the tens-place of hour display 140 is provided with four the curved grooves 21 and four the display assemblies 3; besides, four of the display sheets are in one-to-one correspondence with four of the windows 11.

Please refer to the digital display of the first embodiment and FIG. 7a~FIG. 7d for the details of the ones-place of minute display 110.

Regarding the tens-place of minute display 120, when the rotation plate of the drive assembly 2 thereof makes a full rotation, the display sheets 31 thereof can orderly display "0"~"5" and "5"~"0" on the windows 11. In other words, 12 digits in total can be displayed after the rotation plate thereof makes a full rotation. Please refer to FIG. 9a~FIG. 9d for the details of the rotation plate and the curve groove 21 of the tens-place of minute display 120.

Regarding the ones-place of hour display 130, when the rotation plate of the drive assembly 2 thereof makes a full rotation, the display sheets 31 thereof can orderly display "0"~"9", "0", "1" and "2" In other words, 12 digits in total can be displayed after the rotation plate thereof makes a full rotation. Please refer to FIG. 10a~FIG. 10d for the details of the rotation plate and the curve groove 21 of the ones-place of hour display 130.

Regarding the tens-place of hour display 140, when the rotation plate of the drive assembly 2 thereof makes a full rotation, the display sheets 31 thereof can display "1"~"AM", "PM" and/or the combination thereof. Please refer to FIG. 11a~FIG. 11b for the details of the rotation plate and the curve groove 21 of the tens-place of hour display 140. Please refer to FIG. 17 for the details of the displaying method thereof. The tens-place of hour display 140 can display 6 statuses. After the rotation plates thereof makes a full rotation, 12 status changes in total can be displayed. Since the tens-place of hour display 140 only has 4 pull rods 32 and 4 display sheets 31, so needs only 2 rotation plates.

The ones-place of minute display, the tens-place of minute display, the ones-place of hour display and the tens-place of hour display have their own "▯"-shaped windows and the display sheets respectively. These displays also have their own relations between the pull rods and the display sheets, which are shown in FIG. 8.

The digital time device further includes a first thumb wheel 111, a second thumb wheel 131, a first ratchet gear 121, a second ratchet gear 141 and transmission mechanisms 150. The first thumb wheel 111 is connected to the drive assembly 2 of the ones-place of minute display 110. The first ratchet gear 121 is connected to the drive assembly 2 of the tens-place of minute display 120. The second thumb wheel 131 is connected to the drive assembly 2 of the ones-place of hour display 130. The second ratchet gear 141 is connected to the drive assembly 2 of the tens-place of hour display 140. There are two transmission mechanisms 150. The first thumb wheel 111 is connected to the first ratchet gear 121 via one of the transmission mechanisms 150 and the second thumb wheel 131 is connected to the second ratchet gear 141 via the other one of the transmission mechanisms 150. In this way, when the digit displayed by the ones-place of minute display is changed from "9" to "0", the first thumb wheel 111 drives the first ratchet gear 121 via the transmission mechanisms 150 to make the first ratchet gear 121 rotate 30 degrees at a time. When the digits displayed by the ones-place of minute display and the tens-place of hour display are changed from "9" to "10", from "11" to "12" and from "12" to "1", the second thumb wheel 131 drives the second ratchet gear 141 via the transmission mechanisms 150 to make the second ratchet gear 141 rotate 30 degrees at a time.

Each of the transmission mechanisms 150 includes a link rod 151, an adjustable extension tip 152 and a tension spring 153. The adjustable extension tip 152 is fixed on the link rod 151, and presses against the first ratchet gear 121 or the second ratchet gear 141. The link rod 151 is provided with a stopper 1511, and the first thumb wheel 111 or the second thumb wheel 131 presses against the stopper 1511. The link rod 151 is slidingly connected to the lower mainboard 5. One end of the tension spring 153 is fixedly connected to the link rod 151 and the other end of the tension spring 153 is fixedly connected to the lower mainboard 5. After the first thumb wheel 111 rotates to drive the display sheets 31 to display "1"~"9" and the stay at the position of "0", the tip of the first thumb wheel 111 is at the lowest position. Then, the tip of the first thumb wheel 111 pushes the stopper 111 to make the link rod 151 slide forward so as to make the adjustable extension tip 152 push the first ratchet gear 121. After the first ratchet gear 121 rotates for one time, the tension spring 153 pulls back the link rod 151.

When the time needs to be displayed as "1:00", "10:00" and "12:00", the three tips, corresponding to "1:00", "10:00" and "12:00", of the second thumb wheel 131 would reach the lowest point one after another. Then, one of the tips of the second thumb wheel 131 pushes the stopper 1511 to make the link rod 151 slide forward so as to make the adjustable extension tip 152 push the second ratchet gear 141. After the second ratchet gear 141 rotates for one time, the tension spring 153 pulls back the link rod 151.

The digital time device further includes two positioning locking pawls 160. One of the positioning locking pawls 160 is rotatably connected to the tens-place of minute display 120 in order to make the first ratchet gear 121 rotate to the designated position. The other one of the positioning locking pawls 160 is rotatably connected to the tens-place of hour display 140 so as to make the second ratchet gear 141 to rotate to the designated position.

The digital time device further includes a time trigger and a first motor (not shown in the drawings). The output shaft of the first motor (not shown in the drawings) is connected to the drive wheel 7 of the ones-place of minute display 110. The time trigger is electrically connected to the first motor (not shown in the drawings). In this way, the time trigger transmits a trigger signal to the first motor (not shown in the drawings) every minute. The first motor (not shown in the drawings) drives the drive wheel of the ones-place of minute display 110 to make a full rotation in order to drive the driven wheel 8 to rotate 36 degrees, which can change the digit displayed by the ones-place of minute display 110 for one time. The time trigger is a currently available component; the power consumption of the time trigger is low because the first motor (not shown in the drawings) can change the displayed digit on the condition that the first motor (not shown in the drawings) is powered for one time every minute. Please refer to the first embodiment for other contents not described in this embodiment.

The digital time device further includes a touch rotation plate 170, a microswitch (not shown in the drawings) and a second motor (not shown in the drawings). The edge of the touch rotation plate 170 is provided with two protrusion blocks 171 symmetrical to each other. The touch rotation plate 170 is connected to the drive assembly 2 of the tens-place of minute display 120. The microswitch (not shown in the drawings) is fixed on the rack 100 and the protrusion blocks 171 can trigger the microswitch (not shown in the drawings). The microswitch (not shown in the drawings) is electrically connected to the second motor and the second motor is connected to the drive assembly 2 of the ones-place of hour display 130. When the tens-place of minute display 120 displays "0", the two protrusion blocks 171 are in upright status. Touch will occur when the display shows 0-5 for two times; at the moment, one of the protrusion blocks 171 touches the microswitch (not shown in the drawings). Then, the microswitch (not shown in the drawings) transmits a trigger signal to the second motor (not shown in the drawings) and the second motor (not shown in the drawings) drives the drive assembly 2 of the ones-place of hour display 130 to rotate. More specifically, the ones-place of hour display 130 is also provided with a drive wheel 7 connected to the output shaft of the second motor (not shown in the drawings). The second motor (not shown in the drawings) drives the drive wheel 7 to make a full rotation after receiving the trigger signal, and the drive wheel 7 drives the driven wheel 8 to rotate 30 degrees for one time, which can make the digit displayed by the ones-place of hour display 130 be changed for one time.

The above disclosure is related to the detailed technical contents and inventive features thereof. Those skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A digital display, comprising:
  a housing, provided with seven windows arranged to form a shape of a character " ▯ ";
  a mainboard assembly, fixedly connected to the housing and located behind the windows;
  a drive assembly, provided with seven curved grooves;
  a plurality of display assemblies, comprising display sheets and pull rods, one end of each of the pull rods being fixedly connected to the display sheets, and the display sheets being slidingly connected to the mainboard assembly;
  wherein the number of the display assemblies is seven, and each of the pull rods is slidingly connected to the curved grooves in one-to-one correspondence, and each of the display sheets is in one-to-one correspondence with the windows.

2. The digital display of claim 1, wherein each of the pull rods is provided with a sliding block fixed thereon and each of the sliding blocks is slidingly connected to the curved grooves in one-to-one correspondence.

3. The digital display of claim 1, wherein the drive assembly comprises a first rotation plate, a second rotation plate, a third rotation plate, a fourth rotation plate, a first rotation shaft and a second rotation shaft, wherein one side of the first rotation plate is provided with a first curved groove and the other side of the first rotation plate is provided with a second curved groove, wherein one side of the second rotation plate is provided with a third curved groove and the other side of the second rotation plate is provided with a fourth curved groove, wherein one side of the third rotation plate is provided with a fifth curved groove and the other side of the third rotation plate is provided with a sixth curved groove, wherein one side of the fourth rotation plate is provided with a seventh curved groove, wherein the mainboard assembly comprises an upper mainboard and a lower mainboard, the first rotation shaft is fixedly connected to circle centers of the first rotation plate and the second rotation plate, and is rotatably connected to the upper mainboard, the second rotation shaft is fixedly connected to circle centers of the third rotation plate and the fourth rotation plate, and is rotatably connected to the lower mainboard, and the first rotation shaft is transmissionally connected to the second rotation shaft.

4. The digital display of claim 3, wherein the other end of each of the pull rods is provided with a long circular hole, and the long circular hole is sleeved on the first rotation shaft or the second rotation shaft.

5. The digital display of claim 3, wherein the drive assembly comprises a first gear and a second gear, wherein a circle center of the first gear is fixedly connected to the first rotation shaft, a circle center of the second gear is fixedly connected to the second rotation shaft, and the first gear engages with the second gear.

6. The digital display of claim 3, wherein each of the display assemblies further comprises a first lever plate and a second lever plate, wherein one end of the first lever plate is hinged on one end of one of the display sheets, the other end of the first lever plate is hinged on one end of one of the pull rods, and the first lever plate is further rotatably connected to the mainboard assembly, wherein one end of the second lever plate is hinged on one end of one of the display sheets, the other end of the second lever plate is hinged on one end of one of the pull rods, and the second lever plate is further rotatably connected to the mainboard assembly.

7. The digital display of claim 3, further comprises a drive wheel and a driven wheel, wherein the drive wheel is rotatably connected to the housing, a circle center of the driven wheel is fixedly connected to the second rotation shaft, and the drive wheel is connected to the driven wheel.

8. A digital time device, comprises a rack, a ones-place of minute display, a tens-place of minute display, n ones-place of hour display and a tens-place of hour display fixed on the rack, wherein each of the ones-place of minute display, the tens-place of minute display, the ones-place of hour display and the tens-place of hour display is the display described in claim 1, wherein the tens-place of hour display is provided with four of the curved grooves and four of the display assemblies, and four of the display sheets are in one-to-one correspondence with four of the windows;
  the digital time device further comprising a first thumb wheel, a second thumb wheel, a first ratchet gear, a second ratchet gear and transmission mechanisms, wherein the first thumb wheel is connected to a drive assembly of the ones-place of minute display, the first ratchet gear is connected to a drive assembly of the tens-place of minute display, the second thumb wheel is connected to a drive assembly of the ones-place of hour display, the second ratchet gear is connected to a drive assembly of the tens-place of hour display, wherein there are two transmission mechanisms, the first thumb wheel is connected to the first ratchet gear via one of the transmission mechanisms, and the second thumb wheel is connected to the second ratchet gear via the other one of the transmission mechanisms.

9. The digital time device of claim 8, wherein each of the transmission mechanisms comprises a link rod, an adjustable extension tip and a tension spring, wherein the adjustable extension tip is fixed on the link rod, and presses against the first ratchet gear or the second ratchet gear, wherein the link rod is provided with a stopper, and the first thumb wheel or the second thumb wheel presses against the stopper, wherein the link rod is slidingly connected to the lower mainboard, one end of the tension spring is fixedly connected to the link rod and the other end of the tension spring is fixedly connected to the lower mainboard.

10. The digital time device of claim 9, further comprising a touch rotation plate, a microswitch and a second motor, wherein an edge of the touch rotation plate is provided with two protrusion blocks symmetrical to each other, the touch rotation plate is connected to the drive assembly of the tens-place of minute display, the microswitch is fixed on the rack and triggered by one of the protrusion blocks, wherein the microswitch is electrically connected to the second motor and the second motor is connected to the drive assembly of the ones-place of hour display.

\* \* \* \* \*